UNITED STATES PATENT OFFICE 2,048,967

CEMENT IMPROVER AND METHOD

Clarence R. Rex, Toledo, Ohio

No Drawing. Application March 21, 1932,
Serial No. 600,384

11 Claims. (Cl. 106—24)

This invention relates to material having lubricating properties and coacting to minimize or eliminate voids in cementitious materials.

This invention has utility when used alone for its flow promotion properties, or when incorporated in mixes of cementitious material. In water it has a smoothness to draft as coating or spreading on hard material, while in mixes it promotes fluidity with properties of easy working, as wall coatings and floors or pavements. The property of easy working is attributed to its controlled quantity of moisture carried by the magnesium hydrate. In some instances, when desired, this magnesium hydrate may be supplemented by hydrous aluminum silicate. This material when produced, as herein disclosed, from dolomite, has quick setting as responsive for minimizing working in the production of the desired surface; quickening curing time, giving less out-of-service time for roads and bridges, or for the work to be used. A factor to this end is believed to be the carbonate and its speeding up co-operation in crystallization reaction. This material has increased hardness, making more resistant to earlier use; increased strength, promoting use of lower factor of safety; reduced volume change in setting to an extent eliminating cracking or fractures from such cause. It has the capacity of holding or adhering to the constituents, which in the concrete mix results in holding the coarse aggregate against segregation. The composition makes the dry finished material of plastic mortar or concrete cement more white; and gives the material a density of body for effective water-tightness.

Special value is obtainable in the operations as herein conducted. By this peculiar or special attention, the range of utility and the definiteness of control are more accurately determined.

The material as quarried hereunder, may, to an advantage, be a calcium rock carrying 30 per cent or more of magnesium carbonate and usually termed a dolomite. The dolomite is reduced by crushing and then separated for sizes preferably by screening. The stone may run over seven inches and under eleven inches. This stone is introduced into an upright or shaft kiln and given the heat treatment or kiln burning, preferably in a range between 900° and 1000° C. for say four hours. This dolomitic rock as found in Northwestern Ohio and used, applicant has found, under this treatment becomes inert or inactive to water of hydration as to the magnesium oxid.

The flow of $CO_2$ from the kiln is measured and when the records show such gas flow to drop to 18%, the burned lime from the kiln is drawn out upon a conveyor and graded by hand picking. The hand picking process removes all overburned material and also the underburned material. The residual product, after having had the overburned and underburned portions removed, is then massed and sampled and the refractive index determined. The extent of this burning, which is quite uniformly conducted, is run desirably to give refractive index between 1.5 and 1.7 when the refractive index of the raw dolomite was about 1.4. Additional physical identification for this extent of burning is found in the decreased conductivity which in instances have brought about a change of from 880 to 1200 and in direct proportion to the temperature and time of heating. The specific gravity is also reduced over the time interval, say in heating at 950° C., wherein after forty-five minutes, the powder may have a specific gravity of 3.29; after four hours, the specific gravity arose to approximately 3.50. This is a ready check method for determining the extent to which the carbon dioxid has been driven off from the rock. In practice it is desirable hereunder that by weight there be retained between 5 and 7 per cent of the raw carbonate, which in the use of the product speeds up crystallization reaction for rapid setting.

This calcined material is subdivided, preferably by hammer mill, to pass through a sieve having its mesh ten to the inch, and is now ready for the special hydration, conducted to impart the controlled water-carrying properties for the desired degree of plasticity.

The liquor for the hydration hereunder is charged or carries in solution, magnesium chloride, preferably, although a chloride of less affinity than calcium for chlorine may be adopted, as a strontium chloride or aluminum chloride.

The proportion of this magnesium chloride should not be in excess of 12% of the magnesium oxid content. This hydration liquor at a temperature preferably between 12° and 20° C. is supplied to the sub-divided predominantly-oxid alkaline earth material while the material is at a temperature between 60° and 65° C. The liquor is preferably not flooded upon the material but is delivered as a fine spray on the material while the hydrator is operating to move the material. The spray is in such excess and there is such freedom for conducting off heat that in the exothermic reaction the material shall be held down against any marked rise above the boiling point of water in the open, and in practice this is kept down not to exceed 105° C. for obtaining better results hereunder.

This hydration reaction produces magnesium hydrate which, desirably, may be in the range up to 15% of the entire solid mass by weight. This magnesium hydrate has great avidity for water and will readily take on and hold ten to fifteen times its own weight of water. In keeping the proportion of magnesium hydrate low there is minimized tendency for shrinkage, such as might form hair lines in a wall. When it is desired to promote plasticity by carrying additional moisture and keeping the magnesium hydrate proportion down, or lowering the magnesium hydrate content, this can be done by reacting upon the magnesium oxid, even though it be in periclastic form. Hydrous aluminum silicate, or a hydrogel of silica and alumina, may be used in a range of 5 to 20% in the hydration liquor. It is thus seen that, collateral to the magnesium hydrate, there is possible here the introduction of additional water-carrying capacity twenty-five times by weight of the magnesium oxid acted upon.

This reaction starts in from one to two minutes and as the reaction proceeds a rapid rise in temperature occurs to 96° to 99° C. slowing up with final rise to 100° to 102° C., which converts the excess of water not combining in the reaction into steam vapor which is rapidly removed from the hydrating mass. The operation requires about fifteen minutes to complete, resulting in a fine dry white powder. During the progressing of this hydration and, as practically completed, there is an addition made of 2½% to 5% of this hydration liquor to the charged material; or other means, such as moisture-laden atmosphere, is provided to maintain this excess of humidity; and the product is placed in storage for thoroughly digesting in seasoning or completing the hydration operation. This period may advantageously run for about fourteen days with volume increase therefrom running frequently 10% or greater.

The quantity of water solution used in the process ranges between 25% and 30% of the total weight of the oxids. The amount of water chemically combining, ranges, between 15½% and 16% in the first reaction. During the digesting reaction any free moisture remaining in the product is combined, giving a combined water of about 18%. This digestion reaction goes on under a temperature ranging from 60° to 88° C. finally falling to below 44° C. which shows digestion to be completed. This substance containing magnesium hydrate is produced in a semi-dry state and brought to a dry state by its own heat of reaction. This more or less crumbly mass is then sub-divided by grinding in a humid atmosphere as in the presence of steam or water vapor, and is in condition for packaging and transporting or storing for use.

It may be assumed that 100 lbs. of dolomite is taken, comprising 44 lbs. magnesium carbonate and 56 lbs. calcium carbonate. Eliminating deduction for over and under burning, the result of the calcining here is:

|  | Pounds |
|---|---|
| Magnesium oxid | 22 |
| Calcium oxid | 30 |
| and say |  |
| Calcium carbonate | 6 |

Hydrating with 12% magnesium chloride as to the total of magnesium oxid, there is used about 2½ lbs. of magnesium chloride to approximately 18.3 pounds of water and the hydration approximates:

|  | Pounds |
|---|---|
| Magnesium oxid | 22 |
| Calcium hydrate | 40 |
| Calcium chloride | 3 |
| Calcium carbonate | 6 |
| Magnesium hydrate | 1½ |

This is the dry powdered material of commerce, which may be combined as an improver in cement operation.

*Reaction to produce magnesium hydrate*

The calcium as herein has a greater affinity for acid radicals than has the magnesium herein. This reaction as conducted hereunder accordingly brings about a transfer or interchange of the chlorine from the magnesium chloride and the calcium. This is brought about during the hydration; that is in the presence of moisture, calcium carbonate, and magnesium oxid. The magnesium oxid is inert to the hydration reaction, due to the time factors in the heating treatment hereunder. This magnesium oxid accordingly does not react with the magnesium chlorid but does react with the calcium to form calcium chlorid and the magnesium therefrom unites to form magnesium hydrate. The transfer is of the hydrate radicals to be taken up by the magnesium as the calcium takes on the chlorine. $Ca(OH)_2$ plus $MgCl_2$ equals $CaCl_2$ plus $Mg(OH)_2$. In the proportions as hereinbefore set forth, it is desirable to have the magnesium hydrate to be not in excess of 20% of the magnesium oxid of the residue of this hydration reaction. The dolomitic oxid, in this hydration as herein conducted, as to the calcium, may effect, up to the chemical equivalent of the magnesium chloride used, complete conversion thereof to the calcium chloride, while the magnesium oxid in the presence of this calcium has not undergone the hydration change.

The special calcining is conducted to impart to the magnesium oxid, a form resistant to direct hydration although susceptible to reaction with silica and alumina. There is, accordingly, hereunder provided a definite controllable reaction as to the incorporation of zero percentage and upward of magnesium hydrate into this hydration material. All or a fraction of the calcium hydrate may be changed to calcium chloride. Magnesium hydrate is excessively buttery or smooth in its qualities or properties with water.

Due to the establishment of the periclase or resistant state for the magnesium oxid, there is not effected herein the Sorel cement reactions:

$3MgO$ plus $MgCl_2$ plus $10H_2O$
equals $3MgOMgCl_2Aq_{10}$ $5MgO$ plus $MgCl_2$ plus $17H_2O$
equals $5MgOMgCl_2Aq_{17}$ This oxychloride product is not a result hereunder, because there is not sufficient concentration of the magnesium chloride but applicant produces the magnesium hydrate and calcium chloride. The temperature of the reaction is one precluding the formation of magnesium chlorid in the presence of the calcium hydrate and there is thus the formation of calcium chlorid. This means there is not any production of oxychlorid, even of magnesium or calcium. The degree of concentration hereunder as disclosed is not high, running from 17 to 27 per cent as to anhydrous magnesium chlorid. Furthermore, an oxychlorid is not formed in the presence of calcium hydrate.

Boric reaction

Additional control for the resultant material may be obtained by incorporating in the liquor of hydration, boric acid of a borate. This boric acid is likewise seized upon by the calcium as against the magnesium in the hydration operation, with the result that there is produced a calcium borate. The proportion of the borate is preferably not in excess of 5% by weight of the calcium oxid of the calcined material before hydration.

Solubilities

The borate and hydrates as produced hereunder, as well as oxids and carbonates, are relatively insoluble or difficultly soluble in water, while the calcium chorlide is most readily soluble. The hydrogen is colloidal.

Leaching

For certain materials, this calcium chloride may be readily leached or washed out of the mixture. For other purposes, it may be desirable to leave this calcium chloride in as it possesses especial value for plastic material operations say below 0° C. Furthermore, it is an incorporated additional water affinity or hygroscopic agent permeating the mass so controllably dominating the setting that there is not material tendency for shrinkage or the development of shrinkage occurrence in setting. Again, especially in the borate combination, this chloride does not develop tendencies to effloresce, and thus leaves the material in acceptable shape when used as a brick or stone cement in laying up brick, stone, terra cotta, or other work.

Compounds

Observed results in practice establish utilities as herein enumerated. While this material of the invention herein described has hydrate properties of plasticity, a great field of its usefulness is for gauging into other ingredients as used in the various industrial processes of masonry and stone operations, as well as wall finishes. The material hereunder may be incorporated according to the character of the work to be done and may vary with the mixes. For instance, for concrete of 1–1½–3 mix, this material may be added to 10% of the weight of the cement: wherein the cement is 1, the sand 1½ and the broken stone 3 parts. When there is a 1–2–4 mix, this material may be 12% of the weight of the cement. In a 1–2½–5 mix, this material may be 14% of the weight of the cement. In a 1–3–6 mix, this material may be 16% of the weight of the cement.

For mortar with 1 bag of cement there may be used 2 bags of the material hereunder and 3½ parts by volume of sand.

For stucco there may be used 1 bag of sand, 1 bag of the material hereunder and two bags of hydrate, with 2½ parts of hair or binder.

For scratch coat, there may be, under the stucco formula, sand 3 parts to 1 of the stone; formula for brown coat, 3½ parts to 1; finish coat, with no hair, but such coat to be sanded, there may be 3½ to 4 parts of sand to 1 of the stucco combination without the hair.

For whitewash, to resist heat, there may be used 1 bag of cement to 2 bags of the material hereunder.

The magnesium hydrate has such a mobility or freedom for flowing, that it effectively permeates to such an extent as to reduce the voids and to give a density in product effective in the mass of the product for water tightness. Accordingly, as used for a gauged-in material, in cellar walls, cisterns, sewers, or other structures, there is a resultant wall effective for holding out or holding in the liquid against passing through such wall. This means that the wall structure itself accomplishes the end independently of a supplemental or additional treatment. There is utility in this for floor work and pavements wherein seepage material or liquids therethrough may be detrimental to building structures. This means also that the liquids as not passing therefrom have no tendency to leach out the elements and there is retention of unusual rigidity of structure hereunder.

When used as an improver for mortar, the thrown material from the trowel has a run or spread distance over the laid-up wall, for direct distribution at the throw in developing the desired thickness of such cement or mortar without additional spreading with a trowel. In cement operations, especially where towers or chutes are used, there is flow in the chute upon the work with a minimum of rise or a very low angle of repose, attributable to a great extent to the moisture carried in the mixture. This is a factor in economy in setting up towers and chutes for a range of operations.

Furthermore, in this running out of the material, it carries the uniform mix with it for it holds in suspension the aggregate, as well as sand and cement, when gauged in, say for even 5% as to the cement, although in practice, it may without detriment be run up to 15% or 20% as to the cement. This is a factor in whitening the finished material. The holding of the aggregate in the putty means that tamping may be minimized or greatly reduced, for the aggregate has not a tendency to settle out, and the wall has the aggregate maintained uniform throughout the structure even though the mixes be run for considerable depth at a time. This is a property which tends to hold the aggregate even closed to the upper or outer surface of the cast. However, if there be occasion for finished trowelling or working, such may be completed with a minimum of labor. In the pouring there may be a float bar run or drawn over to gauge the top surface of the wet material, and within the course of an hour or an hour and one-half, when the material is approaching set, a practically once-over trowelling determines the finished surface.

Due to the void minimizing properties hereunder, this fluidity of the mix is obtainable without excess of water beyond that required for proper mixture in the cement or plastic material. Avoidance of this more free water excess means avoidance of washing away of cement or plastic material. This reduction in the quantity of water at the final mixing is due to the fact that this magnesium hydrate thoroughly disperses itself in the mass for minimizing voids.

The time for setting or curing is reduced by this substance when incorporated in a cement plaster. It has a quicker time for setting. The strength of the mass is increased. It has a degree of permanency materially enhanced. It may, as itself, be molded or cast into slabs of a considerable degree of translucency, and the material cut, drilled, threaded and polished to form an artificial marble. As a wall or finish coating material, it has plasticity attributes as distinguished from mason hydrate attributes.

Modification

While the raw material taken hereunder has in this instance been dolomitic, high calcium lime may be used. The specific gravity of this material runs about 2.4% which is slightly less than 8% below the specific gravity of the similar dolomitic material not given this treatment hereunder.

If a hydroxid product hereunder be ground with such severity as to produce a sufficiently high temperature to liberate a part of the water of hydration, the resultant product will become non-plastic and fall below the 200 plasticity figure as determined on Plasticimeter described in U. S. Bureau of Standard's Technological Paper No. 169. On the other hand, by grinding this resultant hydro-chloro-boro-calcium-magnesium oxid in the presence of moisture vapor, test of the resultant product shows a plasticity factor of 250 or greater, and that a storage for ten months has failed to destroy this plasticity. Furthermore, this substance will make up into a plastic putty ready for use within two and one-half hours.

As a lubricant material, this magnesium hydrate containing substance may be put into solution and used as a coating where the material is to move or have a drawing action which offers resistance, as in wire drawing operations. The hydrate hereunder has an alkaline reaction tending to clean, as well as lubricate in this treatment.

This magnesium hydrate herein has a degree of physical sub-division peculiarly identifying this product in that 80% of the product hereunder may pass a theoretical 750 mesh per inch sieve, while 60% to 65% of this material may pass through a theoretical 1600 mesh per inch sieve. The basis for the used figures is that usual in laboratory practice of micron measurement through a microscope. This degree of subdivision is attributed to temperature control and the types of reaction conducted hereunder.

While, the magnesium chloride is suggested as the chloride for hydration liquor, the weaker-than-calcium chlorides may be used alone or in different combinations for producing limited definite percentages of the hydrates of strontium and aluminum within the mixture.

The control qualities of the material hereunder may be definite as to more or less magnesium hydroxide, as well as to the quantity of calcium chloride. This latter may be leached out entirely, partially, or left in as to a predetermined control quantity. This calcium chloride seems to have deflocculating properties improving the uniform suspension of different materials in the aggregate, even to supplement the colloidal properties of the hydrogel, when the latter is used. The cooperation hereunder may be considered as a keying providing projections as a sort of slip insurance which, as thus keying the various elements of the mix against shifting, not only holds the particle suspended in the aggregate for the set, but seems to be a factor in improving hardness. This advantage of the slip insurance is due to the finely disseminated particles approximating colloidal size. It also improves the hardness and the control rate of set. The calcium chloride as in the cast structure from this material seems to serve as a catalyzer, for it may be even leached from the finished cast without detracting from the physical strength and appearance thereof.

The calcium chloride is created in the medium as a suspension thereof in a hydrous form remaining fixed by the coating of the hygroscopic salt—magnesium hydroxide, magnesium oxid, and calcium hydroxide. That this film coating of the calcium chloride is present is believed to be corroborated by the fact that the material will stand storage independently of taking on atmospheric moisture commensurate with the hygroscopic qualities of the calcium chloride. The product material accordingly retains its initial physical properties as a uniform impalpable powder. This application is a continuation in part of S. N. 123,253, filed July 17, 1926, and copending herewith.

What is claimed and it is desired to secure by Letters Patent is:

1. The method of producing a cementitious material comprising calcining limestone to leave approximately five to seven per cent thereof carbonate with calcium oxid to the extent burned readily responsive to hydration, hydrating with a solution of a chlorid of less affinity for chlorine than calcium affinity for chlorine, said solution being a water solution, and providing the water volume in such excess that the temperature of hydration reaction does not exceed 105° C., said hydrating solution being dilute against forming an oxychlorid.

2. The method of producing cementitious material comprising calcining dolomitic rock to leave approximately five to seven per cent thereof carbonate in association with reaction resistant magnesium oxid and reactive calcium oxid, reacting thereon with a solution of magnesium chlorid and water, controlling the reaction to keep the temperature from exceeding 105° C. and the chlorid to be not in excess of twelve per cent of the magnesium oxid to get a mixture of magnesium oxid, magnesium hydrate, calcium hydrate, calcium chlorid and calcium carbonate, and leaching to remove calcium chlorid therefrom.

3. The method of producing a self-hardening dry powder cementitious material comprising burning dolomitic limestone to magnesium and calcium oxid to such an extent that but a minor portion of its calcium remains calcium carbonate; sub-dividing the material into granular form; and reacting to produce magnesium hydrate from said calcium oxid by hydrating the granular material with a just sufficient amount of solution containing a boric acid radical with the calcium to obtain a dry powder.

4. The method of producing a dry powder cementitious material comprising burning dolomitic limestone in a range of 900° to 1000° C. for driving off carbon dioxid to such an extent that but a minor portion of its calcium remains calcium carbonate; subdividing the material into granular form; and reacting to produce magnesium hydrate from said calcium oxid by hydrating the granular material with a just sufficient amount of solution containing magnesium chlorid to obtain a dry powder containing calcium chlorid, and leaching for obtaining predetermined reduction of the calcium chlorid.

5. The method of preparing a cementitious substance from dolomite comprising calcining dolomite at 900° to 1000° C. to an extent to retain 5 to 7 per cent carbonate, and hydrating with a chlorid solution, said hydrating solution including a boric acid radical.

6. The method of preparing a cementitious substance from dolomite comprising calcining dolomite at 900° to 1000° C. to an extent to retain 5 to 7 per cent carbonate, hydrating with a chlorid solution, and reducing the calcium chlorid content thereof by leaching.

7. The method of preparing a cementitious substance from dolomite comprising calcining dolomite at 900° to 1000° C. to an extent to retain 5 to 7 per cent carbonate, and hydrating with a chlorid solution, said hydrating solution including hydrous aluminum silicate.

8. The method of producing a self-hardening, dry powder, cementitious material comprising burning dolomitic limestone in a range of 900° to 1000° C. to magnesium oxid and calcium oxid to such an extent that approximately six per cent calcium carbonate remains, with the magnesium oxid resistant to direct hydration and the calcium oxid to the extent burned readily responsive to hydration subdividing the material into granular form, hydrating with approximately twelve per cent of magnesium chlorid as to the magnesium oxid from said burning to obtain from the added material of the hydration approximately one-fourth as much magnesium hydrate as said carbonate from the burning, as much as one-half calcium chlorid as to such carbonate with stability for the magnesium oxid and calcium carbonate, said hydration being conducted against the production of oxychlorid at a rate to keep the temperature of hydration against rising above 105° C. and the quantity of the water of said hydration approximating thirty per cent of the total weight of the oxids from the burning, and allowing said mass as hydrated to digest for the temperature to fall to approximately 45° C. in forming a dry mass retaining approximately one-half the water of hydration.

9. The method of producing a self-hardening dry powder cementitious material comprising incompletely burning dolomitic limestone to magnesium and calcium oxid to such an extent that but a minor portion of its carbon dioxid remains, with the magnesium oxid resistant to direct hydration and the calcium oxid to the extent burned readily responsive to hydration; subdividing the material into granular form; and imparting water-carrying properties by hydrating the granular material with a just sufficient amount of solution to obtain a stable dry powder including combined water, said solution including a chemically active substance to react on the material being treated but sufficiently water-dispersed to prevent the formation of oxy-salt products.

10. The method of preparing a cementitious substance from dolomite comprising calcining dolomite at 900° to 1000° C. to an extent to retain five to seven per cent carbonate with magnesium oxid from said calcining resistant to direct hydration, and calcium oxid from said calcining readily responsive to hydration, and hydrating with a chlorid solution sufficiently diluted to produce calcium chlorid to prevent the formation of oxychlorid.

11. A dry powdered material of commerce adapted to be combined as an improver in cement operation, said material approximately including magnesium oxid, twenty-two parts; calcium hydrate, forty parts; calcium carbonate, six parts; magnesium hydrate, one and one-half parts, with absence of chlorid of magnesia and oxychlorid.

CLARENCE R. REX.